United States Patent [19]

Grigsby

[11] Patent Number: 5,141,545
[45] Date of Patent: Aug. 25, 1992

[54] METHOD FOR MAKING OPTICAL FIBRE FUSION SPLICE

[75] Inventor: Richard Grigsby, Chester, England

[73] Assignee: Bicc plc, England

[21] Appl. No.: 701,459

[22] Filed: May 16, 1991

[30] Foreign Application Priority Data

May 23, 1990 [GB] United Kingdom ............... 9011506

[51] Int. Cl.⁵ .................... C03B 23/20; G02B 6/36
[52] U.S. Cl. ........................... 65/4.2; 264/1.5; 385/98; 385/99
[58] Field of Search ............ 65/4.2, 4.21; 264/1.5; 385/96, 98, 99

[56] References Cited

U.S. PATENT DOCUMENTS

| 4,079,927 | 3/1978 | Rocton | 385/98 X |
| 4,662,962 | 5/1987 | Malavieille | 385/98 X |
| 4,778,242 | 10/1988 | Ota et al. | 385/96 |
| 4,812,010 | 3/1989 | Osaka et al. | 385/96 |

FOREIGN PATENT DOCUMENTS

| 2300744 | 9/1976 | France | 65/4.21 |
| 2146507 | 6/1990 | Japan | 385/96 |

*Primary Examiner*—Robert L. Lindsay
*Attorney, Agent, or Firm*—Anthony J. Casella; Gerald E. Hespos

[57] ABSTRACT

When effecting a fusion splice between two optical fibres, end parts of the two fibres are introduced transversely into opposite ends of an open-ended channel in a surface of a rigid elongate support member having at a position intermediate of its ends and in the surface a transversely extending open-ended slot for temporarily accommodating the electrodes by which fusion splicing is to be effected. After fusion splicing of the fibres and withdrawal of the electrodes, any space in the channel not occupied by the fushion spliced fibres and the transversely extending slot are filled with a curable material which is permitted or caused to set. A preformed elongate lid is secured to the surface of the support member 1 and the support member and lid provide permanent protection for the fusion splice.

14 Claims, 2 Drawing Sheets

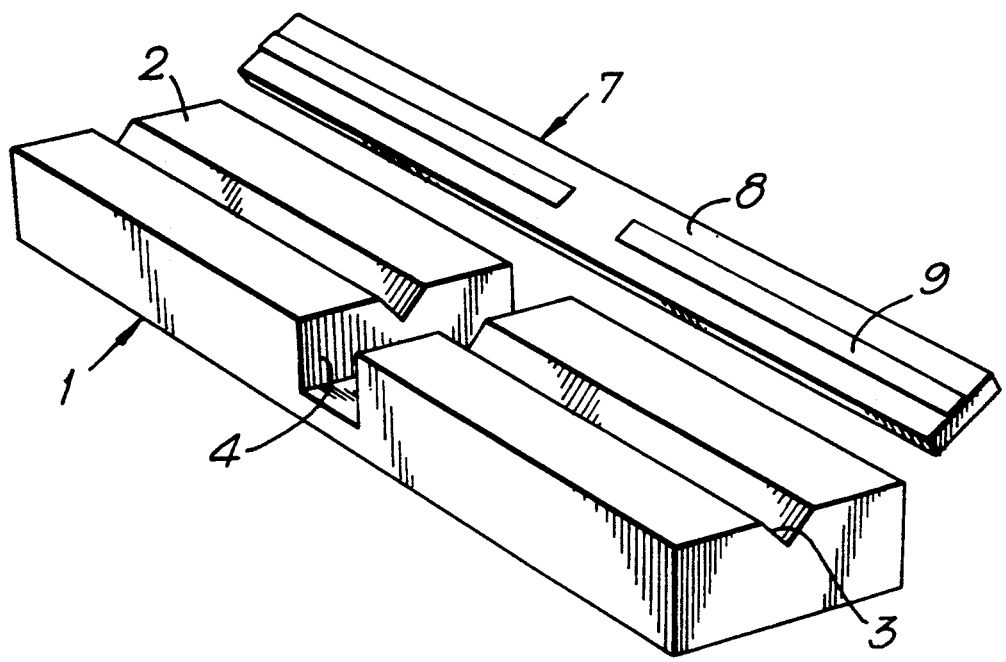
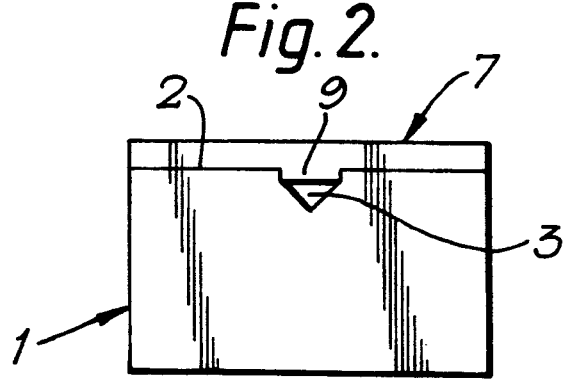

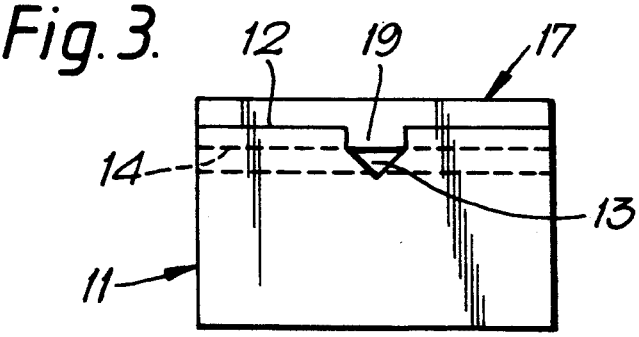
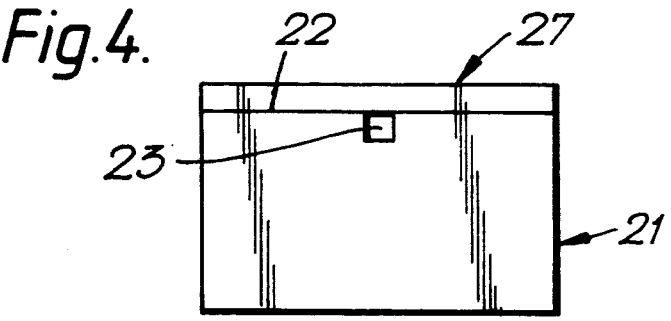
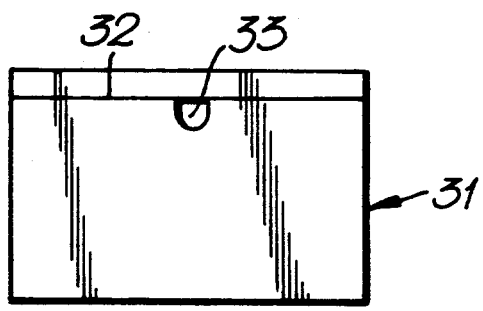

METHOD FOR MAKING OPTICAL FIBRE FUSION SPLICE

This invention relates to end-to-end fusion splicing of optical fibres.

Many techniques differing from one another have been proposed for effecting an end-to-end fusion splice between two optical fibres. An ideal fusion splicing technique should be capable of being readily used in the field by a semi-skilled operator and should reliably and repeatedly produce at any location satisfactory fusion splices.

It is an object of the present invention to provide an improved method of effecting an end-to-end fusion splice between two optical fibres, which improved method can be readily and repeatedly effected and substantially reduces the risk that a unsatisfactory fusion splice will be made.

In the improved method according to the invention, end parts of the two optical fibres are introduced transversely into opposite end parts of an open-ended channel in and extending throughout the length of a surface of a preformed substantially rigid elongate support member so that, at a position intermediate of the ends of the support member, the end faces of the optical fibres abut or are spaced a short distance apart, the support member being made of a material which is capable of withstanding the temperature to which it will be subjected during fusion splicing of the fibres and which will have no deleterious effect on the fibres and the support member having at said position intermediate of its ends a transversely extending open-ended slot in said surface or transversely opposed apertures opening into said channel for temporarily accommodating the electrodes by which fusion splicing is to be effected; the electrodes are introduced into said transversely extending slot or transversely opposed apertures and fusion splicing of the adjacent ends of the optical fibres is effected; and, after fusion splicing of the optical fibres has been effected and the electrodes have been withdrawn, any space in the channel not occupied by the fusion spliced optical fibres and the transversely extending slot or transversely opposed apertures are substantially filled with a curable material in a liquid or semi-liquid state and the curable material is permitted or caused to set.

By virtue of the fact that the end part of each optical fibre is introduced transversely into the open-ended channel in a surface of the support member, there is negligible risk of any damage being effected to the end face of the fibre after the fibre has been cleaved and before fusion splicing of the optical fibres is effected. Furthermore, in addition to providing support for the aligned end parts of the optical fibres during the fusion splicing operation, the rigid elongate member also provides permanent protection for the fusion splice between the optical fibres.

After any space in the channel has been substantially filled with curable material in a liquid or semi-liquid state, preferably a preformed elongate lid is secured to that surface of the support member in which the channel lies. The preformed elongate lid may be made of the same material as the elongate support member. If desired, the preformed lid may be temporarily applied to said surface of the support member after the optical fibres have been introduced into the channel and before fusion splicing is effected to assist in retaining the optical fibres in the channel during fusion splicing.

Preferably, the preformed substantially rigid elongate support member is made of a ceramic, vitreous or sintered material.

The open-ended channel in a surface of the elongate support member may be of any transverse cross-section suitable for accommodating aligned optical fibres. Preferred cross-sectional shapes include V-,U-and square cross-sectional shapes.

Suitable curable materials that may be employed include an adhesive which is cured by ultra-violet radiation and a hot melt adhesive which sets on cooling.

The invention also includes, for use in the improved method as hereinbefore described, a two-part component comprising a preformed substantially rigid elongate support member and an associated preformed elongate lid as hereinbefore described.

The invention is further illustrated by a description, by way of example, of four preferred forms of two-part component for use in effecting an end-to-end fusion splice between two optical fibres and of the improved method of effecting an end-to-end fusion splice between two optical fibres with reference to the accompanying drawings.

BRIEF DESCRIPTION OF THE DRAWINGS

FIGS. 1 and 2, respectively, are an exploded isometric view and an end view of a first preferred form of two-part component, and FIGS. 3 to 5 are end views of three alternative preferred forms of two-part component.

Referring to FIGS. 1 and 2, the first preferred form of two-part component comprises a preformed rigid elongate support member 1 and, associated with the support member, a preformed elongate lid 7 separately formed with respect to the support member. The elongate support member 1 has in one major surface 2 an open-ended channel 3 of V-shaped cross-section extending throughout the length of the member Centrally disposed between the ends of the support member 1 is a transversely extending open-ended slot 4 of rectangular cross-section for temporarily accommodating electrodes by which fusion splicing of two optical fibres which have been introduced transversely into the opposite end parts of the open-ended channel 3 with their end faces disposed in the transversely extending slot 4 and spaced a short distance apart. The associated preformed elongate lid 7 for closing the channel 3 in the major surface 2 of the support member 1 has on its inner major surface 8 a discontinuous elongate rib 9 which is adapted to engage in the upper part of the channel 3 (but not the slot 4) so as to locate the lid positively with respect to the support member. The support member 1 and preformed lid 7 are made of a ceramic material which is capable of withstanding the temperature to which they will be subjected during fusion splicing of the fibres and which will have no deleterious effect on the fibres.

When using the two-part component shown in FIGS. 1 and 2 in effecting an end-to-end fusion splice between two optical fibres, end parts of the two optical fibres are introduced transversely into the opposite end parts of the open-ended channel 3 in the major surface 2 of the support member 1 so that, at the transversely extending slot 4, the end faces of the optical fibres are spaced a short distance apart The preformed lid 7 is then temporarily applied to the major surface 2 of the support member 1 to assist in retaining the optical fibres in the channel 3 during fusion splicing. Electrodes are then introduced into opposite ends of the transversely extending open-ended slot 4 and fusion splicing of the adjacent ends of the optical fibres is effected. After fusion splicing of the optical fibres has been effected, the electrodes are withdrawn, the preformed lid 7 is removed and any space in the channel 3 not occupied by the fusion spliced optical fibres and the transversely extending slot 4 are filled with a hot melt adhesive. Before the adhesive has set, the preformed lid 7 is re-applied to the support member 1 so that, on setting of the hot melt adhesive, the lid will be bonded to the support member and the two-part component will provide permanent protection for the fusion splice between the optical fibres.

The second preferred form of two-part component shown in FIG. 3 comprises of a support member 11 having in one of its major surfaces 12 an open ended channel 13 which has a depth substantially greater than the V-shaped channel 3 of the support member 1 shown in FIGS. 1 and 2. Centrally disposed between the ends of and extending transversely with respect to the support member 11 and opening into the channel 13 are transversely opposed apertures 14 for temporarily accommodating electrodes by which fusion splicing is to be effected. A preformed lid 17 has on its inner major surface 18 a discontinuous elongate rib 19 which is of greater depth than the rib 9 on the lid 7 shown in FIGS. 1 and 2 and which engages in the upper part of the channel 13.

In the third preferred form of two-part component shown in FIG. 4, a support member 21 has in one major cross-section and has, centrally disposed between its ends in the major surface, a transversely extending open-ended slot (not shown) for temporarily accommodating electrodes by which fusion splicing is to be effected. A preformed lid 27 does not have an elongate rib for engaging in the channel 24 and will be bonded to the support member 21 by a film of hot melt adhesive.

The fourth preferred form of two-part component shown in FIG. 5 is substantially identical to the third preferred form of two-part component shown in FIG. 4 with the exception that the open-ended channel 33 in the major surface 32 of the support member 31 is of U-shaped cross-section.

What I claim as my Invention is:

1. A method of effecting an end-to-end fusion splice between two optical fibres, which method comprises introducing end parts of the two optical fibres transversely into the opposite end parts of an open-ended channel in and extending throughout the length of a surface of a preformed substantially rigid elongate support member so that, at a position intermediate of the ends of the support member, the end faces of the optical fibres are spaced a short distance apart, the support member being made of a material which is capable of withstanding the temperature to which it will be subjected during fusion splicing of the fibres and which will have no deleterious effect on the fibres and the support member having at said position intermediate of its ends a transversely extending open-ended passage opening into said channel for temporarily accommodating the electrodes by which fusion splicing is to be effected; introducing the electrodes into said transversely extending passage and fusion splicing the adjacent ends of the optical fibres; and, after fusion splicing of the optical fibres has been effected and the electrodes have been withdrawn, substantially filling any space in the channel not occupied by the fusion spliced optical fibres and the transversely extending passage with a curable material in a liquid or semi-liquid state and permitting or causing the curable material to set, the rigid elongate member providing permanent protection for the fusion splice between the optical fibres.

2. A method as claimed in claim 1, wherein, after any space in the channel has been substantially filled with curable material in a liquid or semi-liquid state, a preformed elongate lid is secured to that surface of the support member in which the channel lies.

3. A method as claimed in claim 2, wherein the preformed elongate lid is made of the same material as the elongate support member.

4. A method as claimed in claim 2, wherein the preformed lid is temporarily applied to said surface of the support member after the optical fibres have been introduced into the channel and before fusion splicing is effected to assist in retaining the optical fibres in the channel during fusion splicing.

5. A method as claimed in claim 1, wherein the preformed substantially rigid elongate support member is made of a ceramic material.

6. A method as claimed in claim 1, wherein the open-ended channel in a surface of the elongate support member has a cross-section of substantially V-shape.

7. A method as claimed in claim 1, wherein the transversely extending open-ended passage is a slot in said surface of the support member.

8. A method as claimed in claim 1, wherein the curable material employed is an adhesive curable by ultra-violet radiation and, after said space has been substantially filled with curable material, the curable material is subjected to ultra-violet radiation to cause it to set.

9. A method as claimed in claim 1, wherein the curable material employed is a hot melt adhesive which sets on cooling and after said space has been filled with adhesive in a semi-liquid state, the adhesive is cooled to cause it to set.

10. A protected end-to-end fusion splice between two optical fibres which has been effected by the method claimed in claim 1.

11. A method for making a protected fusion splice between two optical fibres, each said fibre having an end, said method comprising the steps of:
provding a substantially rigid elongate support member formed from a material capable of withstanding temperatures generated during fusion splicing of the optical fibres, said support member being characterized by a longitudinally extending open-ended channel dimensioned to receive an optical fibre, and having a transversely aligned open-ended passage intersecting the open-ended channel;
placing the optical fibres in end-to-end alignment in the channel such that the ends of the fibres are slightly spaced from one another at the intersection of the channel with the transversely extending open-ended passage;
introducing fusion splicing electrodes into the transversely extending open ended passage;
fusion splicing the ends of the optical fibres together;
removing the electrodes from the transversely extending open-ended passage;
placing a flowable curable adhesive into the open-ended channel and the transversely extending passage, such that the flowable curable adhesive substantially surrounds the fusion splice and portions of the optical fibres in the channel; and curing the flowable curable adhesive such that the cured adhesive and the support member permanently protect the fusion splice of the optical fibres.

12. A method as in claim 11 further comprising the steps of: providing a lid engageable with the channel of the support member when the optical fibres are disposed in the channel; and disposing the lid on the support member prior to the fusion splicing of the optical fibres.

13. A method as in claim 12 further comprising the step of removing the lid prior to filling the channel and the transversely extending passage with the flowable curable adhesive.

14. A method as in claim 13 further comprising the step of replacing the lid on the support member after the step of filling the channel and the transversely aligned passage with the flowable curable adhesive and prior to curing the adhesive, such that the adhesive secures the lid to the support member for further protecting the fusion splice and the fibres.

* * * * *